United States Patent
Paul et al.

(10) Patent No.: US 7,971,144 B2
(45) Date of Patent: Jun. 28, 2011

(54) ADAPTIVE CONTENT PLATFORM AND METHOD OF USING SAME

(75) Inventors: Santanu Paul, Cambridge, MA (US); Gary Zakon, Lexington, MA (US)

(73) Assignee: OpenPages, Waltham, MA (US)

(*) Notice: Subject to any disclaimer, the term of this patent is extended or adjusted under 35 U.S.C. 154(b) by 845 days.

(21) Appl. No.: 11/933,071

(22) Filed: Oct. 31, 2007

(65) Prior Publication Data
US 2008/0052729 A1    Feb. 28, 2008

Related U.S. Application Data (63) Continuation of application No. 10/256,613, filed on Sep. 26, 2002, now Pat. No. 7,356,771.

(60) Provisional application No. 60/394,441, filed on Jul. 9, 2002.

(51) Int. Cl.
G06F 17/30    (2006.01)
G06F 3/00    (2006.01)
G06F 3/048    (2006.01)

(52) U.S. Cl. .................. 715/744; 707/825; 715/762

(58) Field of Classification Search .......... 707/825; 715/762, 744
See application file for complete search history.

(56) References Cited

U.S. PATENT DOCUMENTS

| | | | |
|---|---|---|---|
| 6,345,288 B1 | 2/2002 | Reed et al. | |
| 6,397,195 B1 | 5/2002 | Pinard et al. | |
| 6,401,094 B1 | 6/2002 | Stemp et al. | |
| 6,671,673 B1 | 12/2003 | Baseman et al. | |
| 6,735,590 B1 | 5/2004 | Shoup et al. | |
| 6,816,904 B1 | 11/2004 | Ludwig et al. | |
| 6,874,001 B2 | 3/2005 | Narang et al. | |
| 6,951,011 B1 | 9/2005 | Sexton | |
| 6,999,966 B2 | 2/2006 | Liang et al. | |
| 7,010,510 B1 | 3/2006 | Schellhorn | |
| 7,058,648 B1 | 6/2006 | Lightfoot et al. | |
| 7,158,988 B1 | 1/2007 | Kirkpatrick et al. | |
| 7,246,137 B2 | 7/2007 | Paulus et al. | |
| 7,287,218 B1 | 10/2007 | Knotz et al. | |
| 7,313,812 B2 | 12/2007 | Robinson et al. | |
| 7,356,771 B2 | 4/2008 | Paul et al. | |
| 2002/0083124 A1 | 6/2002 | Knox et al. | |
| 2002/0152286 A1 | 10/2002 | Peddu et al. | |
| 2003/0014442 A1 | 1/2003 | Shiigi et al. | |

(Continued)

FOREIGN PATENT DOCUMENTS
WO    WO-0113287 A1    2/2001

OTHER PUBLICATIONS

International Search Report and Written Opinion for International Patent Application No. PCT/US06/12530 mailed Jul. 2, 2008 (10 pages).

*Primary Examiner* — H. S. Sough
*Assistant Examiner* — Charles E Anya
(74) *Attorney, Agent, or Firm* — Wilmer Cutler Pickering Hale and Dorr LLP (57) ABSTRACT

An adaptive content platform includes one or more content-enabled, dependent applications, each of which includes a user interface and business logic. A services layer, which is interfaced with the dependent applications and a software infrastructure, provides one or more services that are usable by the dependent applications.

1 Claim, 8 Drawing Sheets

U.S. PATENT DOCUMENTS

| | | |
|---|---|---|
| 2003/0023953 A1 | 1/2003 | Lucassen et al. |
| 2003/0046201 A1 | 3/2003 | Cheyer |
| 2003/0105644 A1 | 6/2003 | Ali et al. |
| 2003/0204835 A1 | 10/2003 | Budhiraja et al. |
| 2003/0222906 A1* | 12/2003 | Fish et al. .................. 345/744 |
| 2003/0229812 A1 | 12/2003 | Buchholz |
| 2003/0233404 A1 | 12/2003 | Hopkins |
| 2003/0236786 A1 | 12/2003 | Shi et al. |
| 2004/0187140 A1 | 9/2004 | Aigner et al. |
| 2004/0205572 A1 | 10/2004 | Fields et al. |
| 2004/0216084 A1 | 10/2004 | Brown et al. |
| 2006/0074727 A1 | 4/2006 | Briere |
| 2006/0085412 A1 | 4/2006 | Johnson et al. |

* cited by examiner

ADAPTIVE CONTENT PLATFORM AND METHOD OF USING SAME

CROSS-REFERENCES TO RELATED APPLICATIONS

This application is a continuation of application Ser. No. 10/256,613 (now U.S. Pat. No. 7,356,771 B2), filed Sep. 26, 2002, and claims priority from U.S. Provisional Patent Application Ser. No. 60/394,441, entitled "Adaptive Content Platform", and filed on Jul. 9, 2002. The above are incorporated by reference herein for all purposes.

BACKGROUND

This invention relates to software development, and more particularly to software development platforms.

For a suite of applications developed for a common software platform (e.g., an application server platform), each application within the suite typically includes a group of services (e.g., content management services, workflow services, publishing services, search and query services) that are common amongst the applications in the suite.

As the software platform does not allow the services of one application to be shared by another, these services must be coded for and included in each application written for the software platform, even though multiple applications use common services.

SUMMARY

According to an aspect of this invention, an adaptive content platform includes one or more content-enabled, dependent applications (thus forming an application layer), each of which includes a user interface and business logic. A services layer, which is interfaced with the content-enabled dependent applications and a software infrastructure (e.g., an application server), provides one or more services that are usable by the content-enabled, dependent applications.

One or more of the following features may be included. The services layer includes a unique application programming interface for each of the one or more services, such that dependent applications using a specific service make requests through the application programming interface assigned to that service.

The services include a content management service (for storing and managing files), which includes: a repository service for storing files; and a search service for allowing users to search files stored by the repository service, for example.

The services also include a workflow and collaboration service (for managing projects and users), which includes: a workflow service for managing the workflow of files; a user management and authentication service for managing the users and user groups; and an events and notification service for managing and broadcasting notifications to the users that were generated by the services, for example.

Additionally, the services include a multi-modal content creation service (for manual creation and automated importation and conversion of files), which includes: a transformation and content handling service for converting the formats of files; a desktop integration service for manual contribution of content; and an import service for facilitating file importation from external systems, for example.

The services further include a multi-channel deployment service (for publishing files to one or more publishing channels), which includes: a publishing service for publishing files to one or more publishing channels (such as a web site, an email broadcast, a wireless broadcast, a syndication stream, or a printed publication, for example); a dynamic publishing service; and a static publishing service, for example.

A data layer is interfaced with the software infrastructure, such that the data layer includes one or more databases.

The above-described adaptive content platform may be implemented in a distributed computing system, in that a first (or local) computing device executes the content-enabled, dependent applications, and a second (or remote) computing device executes the services layer. This second computer may be a web server.

In a distributed computing system, the first and second computing devices are interconnected by a network, such as a local area network, the Internet, or an intranet, for example.

The above-described adaptive content platform and distributed computing system may be implemented as a method or a sequence of instructions executed by a processor.

One or more advantages can be provided from the above. By providing the programmer with a common set of reusable services, applications are no longer required to include stand-alone services. Since these applications are not required to include services, application development is significantly accelerated and deployment is simplified. Additionally, by using a common set of services, compatibility issues are minimized. Further, as applications share a common set of services, application size is reduced. In addition, by separating an application's services from the application's business logic/user interface, distributed computing is possible, leading to superior scalability and availability.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
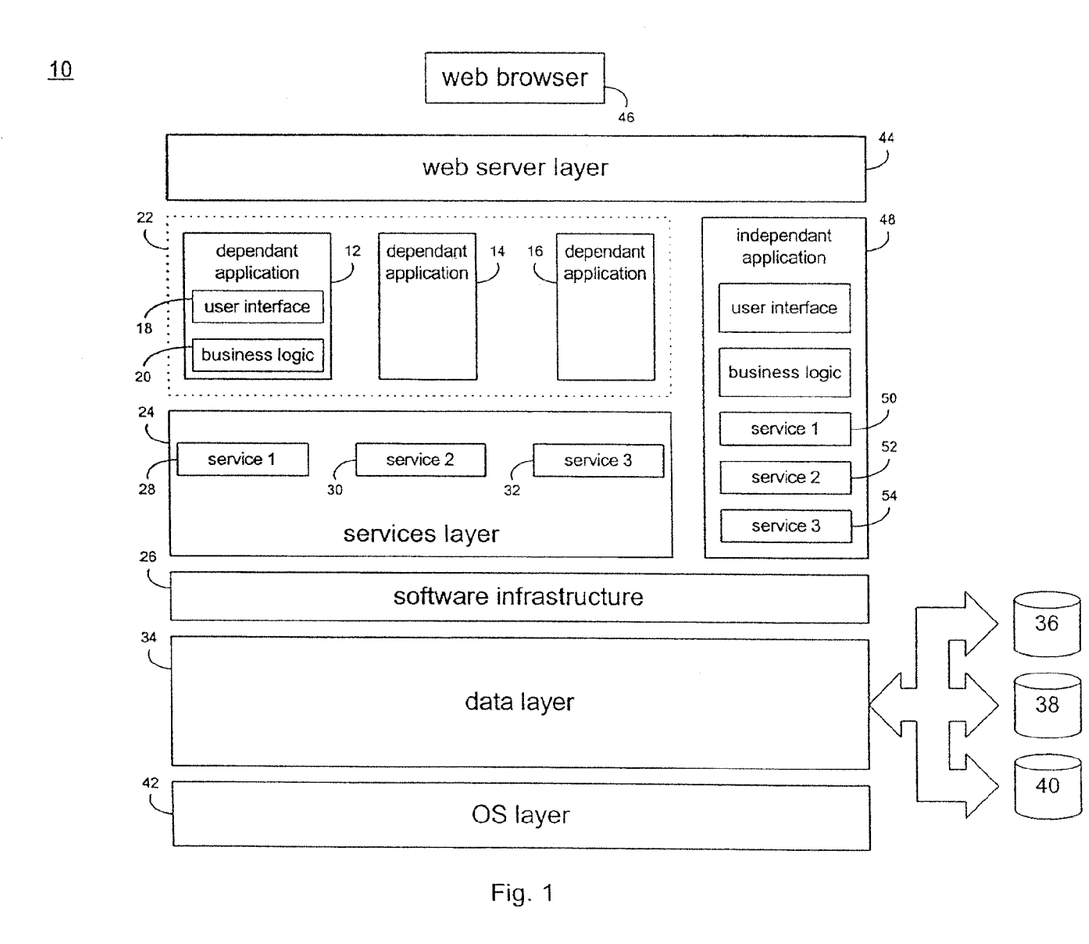
FIG. 1 is a block diagram of an adaptive content platform.

Referring to FIG. 1, an adaptive content platform 10 includes one or more dependent applications 12, 14, 16, each of which includes a user interface (e.g., user interface 18) and business logic (e.g., business logic 20). This group of dependent applications may be referred to as an application layer 22. Each user interface 18 allows a user of the dependent application to access and use the functionality of the dependent application. Business logic 20 performs the functions native to the dependent application. Note that while dependent applications typically include some form of user interface, this is not required.

Typically, the dependent applications 12, 14, 16, are content-enabled dependent applications, in that they manage and process content (e.g., documents, images, audio clips, video clips). Examples of content-enabled applications are web content management systems, shareholder and regulatory reporting applications, corporate marketing and communications systems, newspaper publishing systems, and so forth. Content-enabled applications typically include a combination of content management, workflow management, and publishing capabilities.

Adaptive content platform 10 is a multi-tiered software architecture that includes a services layer 24 for interfacing the application layer 22 and a software infrastructure 26 (e.g., an application server). Examples of an application server are BEA Weblogic™, and IBM Websphere™, both of which implement the Java™ 2 Enterprise Edition standard (J2EE).

Services layer 24 provides a group of services 28, 30, 32, which are available for use by dependent applications 12, 14, 16. Examples of these services include content management services, search services, and file conversion services, for example. These services, which will be discussed below in greater detail, are shared services common to the dependent applications; as opposed to each dependent application's native functions, which are handled by the dependent application's business logic.

Dependent applications 12, 14, 16 may be J2EE ("Java™ 2 Enterprise Edition") compliant dependent applications that adhere to v1.3 standards and are compatible with and run on a Java™ 2 Enterprise Edition application server.

A data layer 34 is interfaced to the software infrastructure 26, and provides data services for platform 10. Data layer 34 may provide access to database servers 36, such as Oracle™, IBM DB2™, and Microsoft SQL Server™. Further, data layer 34 may provide access to file servers 38, such as Microsoft Windows 2000 Servers™, Microsoft Windows NT Servers™, and Unix Servers™. Additionally, data layer 34 may allow access to legacy systems 40 (i.e., applications and data that have been inherited from languages, platforms, and techniques earlier than current technology).

Data layer 34 is typically interfaced with an operating system (OS) layer 42, which includes the operating system that manages the above-described layers, infrastructures, and dependent applications. Examples of compatible operating systems are Windows™, Solaris™, and Linux™.

Typically, a web server layer 44 is interfaced with the application layer (i.e., dependent applications 12, 14, 16) and allows a user (not shown) to use and access the functionality of the individual dependent applications from with a web browser 46 (e.g., Microsoft Internet Explorer™, Netscape Navigator™). Examples of web server layer 44 are Microsoft Internet Information Server™, and Apache Web Server™.

By combining the user interface 18 and business logic 20 of a dependent application 12 with one or more of the services 28, 30, 32 offered by the services layer 24, the functionality of a "stand-alone" independent application 48 can be emulated without the application having to include dedicated services 50, 52, 54.

Concerning the services 28, 30, 32, offered by services layer 24, these services can typically be loosely described as four groups of services, namely: content management; workflow and collaboration; multi-modal content creation; and multi-channel deployment, each of which will be discussed below in greater detail.

Figure 2:
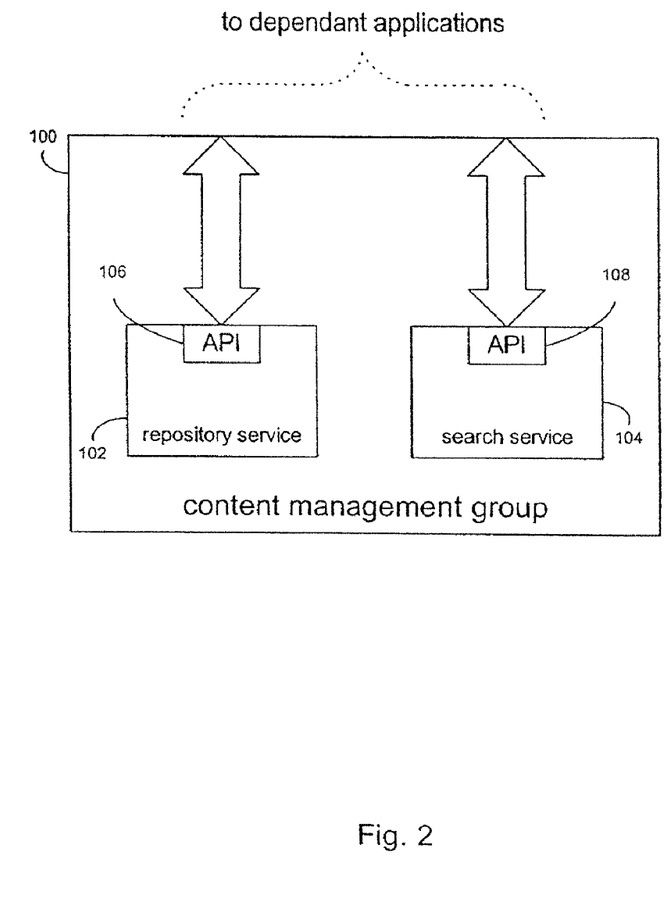
FIG. 2 is a block diagram of a content management group of the adaptive content platform.

Referring to FIG. 2, the content management group 100, which stores and manages files and content used by the adaptive content platform, may include a repository service 102 and a search service 104.

Repository service 102 works in conjunction with the data layer (generally), and the database servers, the file servers, and the legacy systems (specifically) to store, organize, and manage files and content (hereinafter "files").

Repository service 102 allows for the production, organization, and management of numerous content types that define the specific type of files being produced and managed. Additionally, repository service 102 allows users/administrators to define numerous property fields or meta-data fields (e.g., release date, revision number, production date, revision date, and approval date, for example) that define and refine the files stored by the data layer. Access to the files managed by repository service 102 can be controlled by regulating the users who can view, check out, edit, print, and save a particular file, for example. Additionally, the data structure in which the files are stored (e.g., the directory tree structure) is defined and controlled using repository service 102. Typically, repository service 102 works in conjunction with a relational database, e.g., database 36 (FIG. 1), that is accessed through data layer 34 (FIG. 1).

The search service 104 allows a user to search the files stored by the repository service 102. Searches may be performed on either file properties or content. If the files are stored in a structured database (as described above), search service 104 may be an SQL ("structured query language") database query engine. Alternatively, if the files are stored as HTML or XML ("Extensible Markup Language") based documents, search service 104 may use search engine technology to generate a list of relevant documents.

The dependent applications 12, 14, 16 (FIG. 1) described above may access each service offered by content management group 100 (e.g., repository service 102 and search service 104) by making the appropriate request of and establishing a connection through the API ("application programming interface") assigned to that particular service. For example, API 106 is assigned to repository service 102, and API 108 is assigned to search service 104. Therefore, if a user of a dependent application (e.g., dependent application 12, FIG. 1) wanted to execute a search for a particular file, dependent application 12 would make the appropriate request from API 108.

Figure 3:
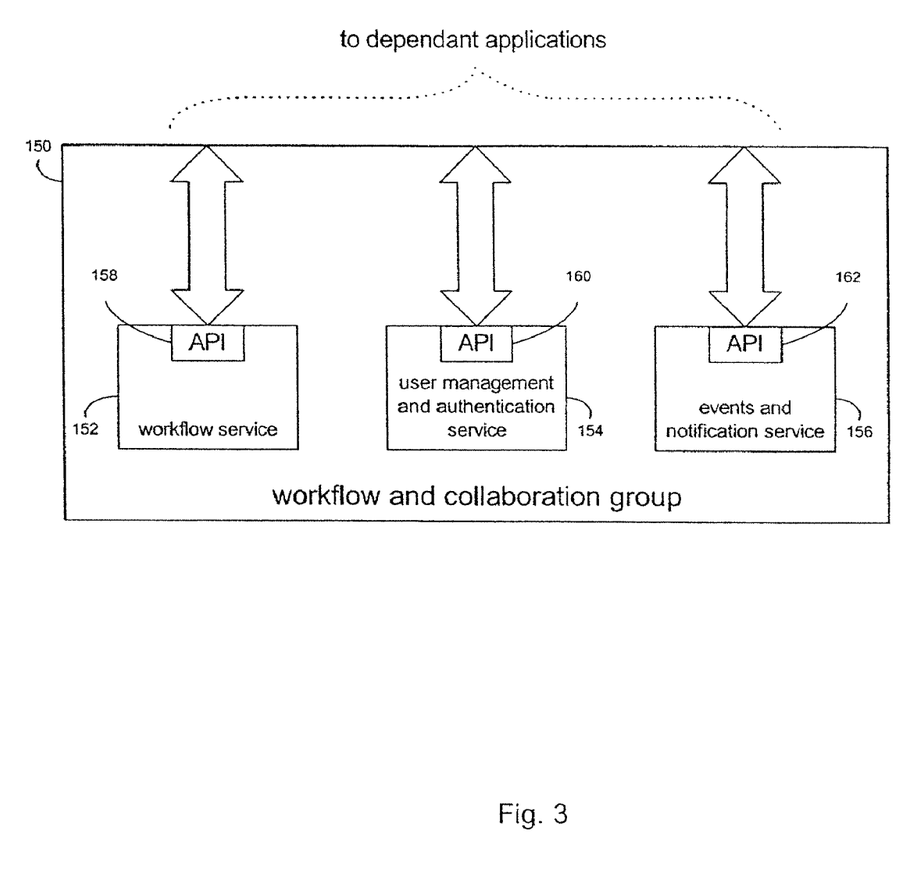
FIG. 3 is a block diagram of a workflow and collaboration group of the adaptive content platform.

Referring to FIG. 3, the workflow and collaboration group 150, which manages projects and users of the adaptive content platform, may include a workflow service 152, a user management and authentication service 154, and an events and notification service 156.

The workflow service 152 allows the administrator or user to control the workflow of files through the adaptive content platform. For example, if a file is produced for publishing purposes, that file might need to be approved by a midlevel manager prior to it being sent to an upper level manager. Further, the upper level manager might have to approve the file prior to it being published or otherwise disseminated. Therefore, workflow service 152 could mandate that the file be approved by a midlevel manager prior to it being sent to the higher level manager, who approves it prior to publication. Further, workflow service 152 may assign time limits for the completion of certain tasks, such as the midlevel or upper level review and approval process.

The user management and authentication service 154 provides a set of tools to the user/administrator that allows them to manage users and user groups. Individual users can be produced and deleted using user management and authentication service 154. Further, the rights and privileges of these individual users also can be controlled and regulated. Additionally, these users can be assigned to, moved between, and deleted from various users groups, which are also maintained using user management and authentication service 154. Further, as rights and privileges can be assigned to a user group, by adding an individual user to a user group, the rights or privileges of an individual user can be efficiently defined.

The events and notification service 156 allows for the delivery of notification events generated by the services offered by the applet service layer 24 (FIG. 1). These message can be delivered to individual users of the system, broadcast to entire user groups, or delivered to the various services offered by the applet service layer 24 (FIG. 1).

As above, the dependent applications 12, 14, 16 (FIG. 1) described above may access each service offered by workflow and collaboration group 150 (e.g., workflow service 152, user management and authentication service 154, and the events and notification service 156) by making the appropriate request of and establishing a connection through the API assigned to that particular service. For this particular group, API 158 is assigned to the workflow service 152, API 160 is assigned to the user management and authentication service 154, and API 162 is assigned to the events and notification service 156.

Figure 4:
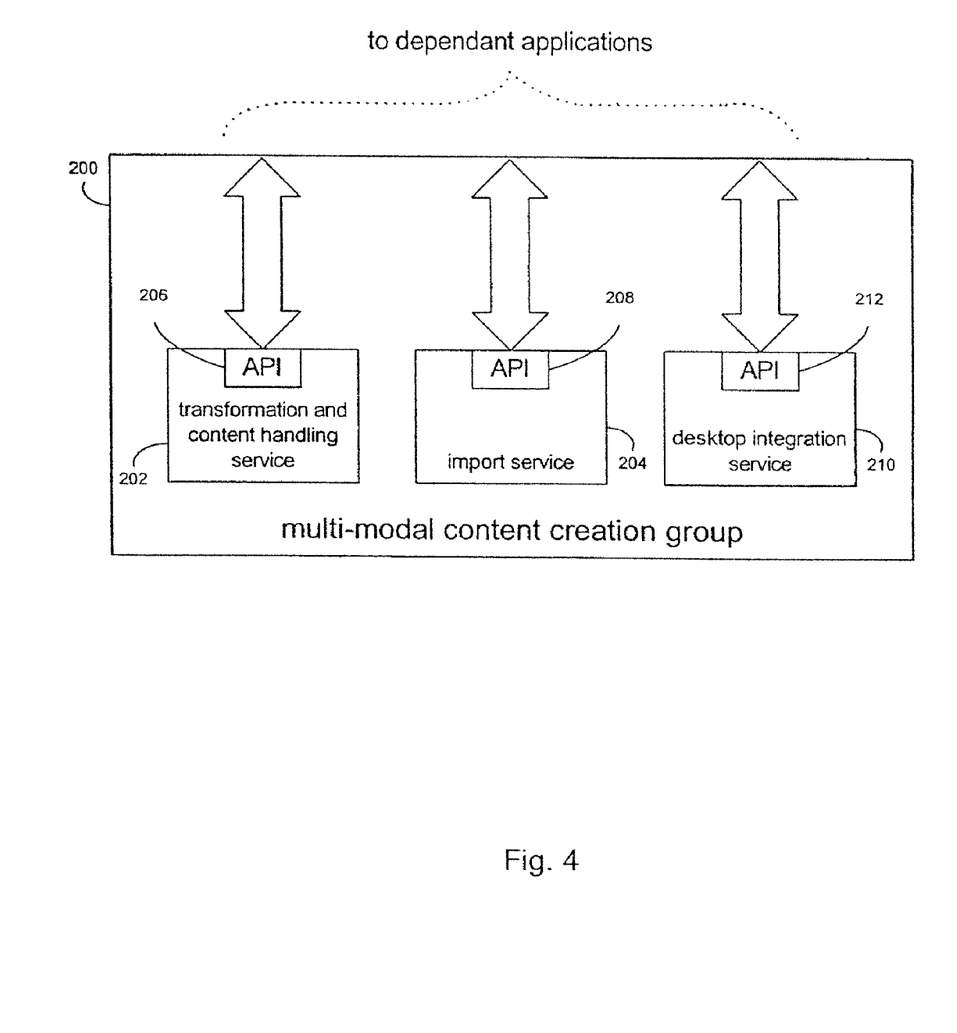
FIG. 4 is a block diagram of a multi-modal content creation group of the adaptive content platform.

Referring to FIG. 4, the multi-modal content creation group 200, which imports and converts files for the adaptive content management platform, may include a transformation and content handling service 202, an import service 204, and a desktop integration service 210.

The transformation and content handling service 202 provides file format conversion services, thus allowing the user to import files of various types and convert them over into a common format (e.g., XML and HTML). Converter templates are available for popular applications, such as Microsoft Word™, Microsoft Excel™, Adobe PDF™, and Microsoft PowerPoint™, for example.

The import service 204 allows for automated import of files from external systems. Import service 204 is configured to monitor, on a periodic basis, the files located on a network drive, an FTP ("file transfer protocol") site, and an HTTP site. When new files are detected on one of these sources, the files are automatically imported into the system. Further, if a format conversion is required, import service 204 will work in conjunction with transformation service 202 to import and convert the file.

The desktop integration service 210 allows content to be contributed by users via standard desktop creation tools. These tools include the Microsoft Office™ suite, as well as Adobe™ and Macromedia™ applications. The service uses the WEBDAV protocol (WEB-based Distributed Authoring and Versioning), which is an extension of the HTTP protocol, to communicate with the desktop tools.

As above, the dependent applications 12, 14, 16 (FIG. 1) described above may access each service offered by multi-modal content creation group 200 (e.g., transformation service 202, import service 204, and desktop integration service 210) by making the appropriate request of and establishing a connection through the API assigned to that particular service. For this particular group, API 206 is assigned to the transformation service 202, API 208 is assigned to the import service 204, and API 212 is assigned to the desktop integration service 210.

Figure 5:
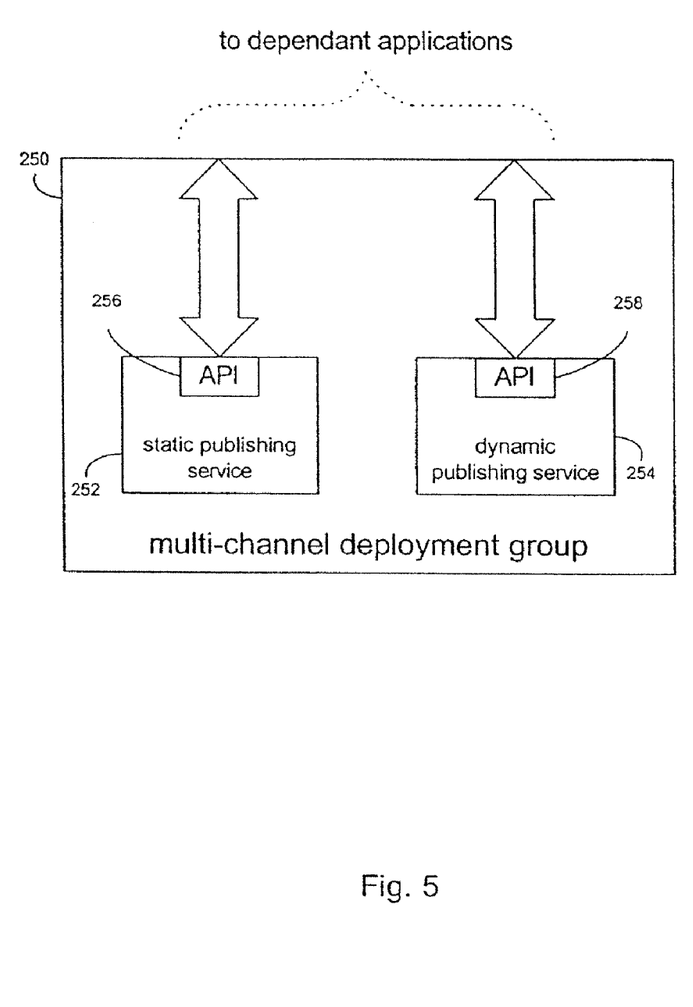
FIG. 5 is a block diagram of a multi-channel deployment group of the adaptive content platform.

Referring to FIG. 5, the multi-channel deployment group 250, which publishes files to one or more publishing channels, may include a static publishing service 252, and a dynamic publishing service 254.

The static publishing service 252 allows for proactive publishing of files based on predefined templates. Therefore, the structure and format of the file published (and the document produced) is defined ahead of time and is not varied depending on the content of the document. Additionally, the content itself is semi-dynamic, in that it changes periodically (e.g. a few times a week). An example of static documents generated using a static publishing service is a newsroom home page of a corporate web site in which one hundred press releases are currently being displayed. The home page is a collection of one hundred summary links, and each link leads to a press release detail page. A corporate communications officer can publish the home page and the one hundred detail pages by invoking the static publishing service, which merges the appropriate press release content with the detail page template to generate HTML. By generating the pages using static publishing, the communications officer ensures that web site visitors have fast page retrieval, since the content is already in HTML format and does not need to be regenerated for every website visitor.

The dynamic publishing service 254 allows for reactive publishing of files that are dynamically altered based on current conditions, user preferences, and query results, for example. In an online auction house that has one-hundred items for sale, a dynamic document may be created in response to a user query. For example, while one-hundred items may be offered, the user (an avid World War II buff) may only be interested in those items that relate to World War II. Therefore, the user would enter their search criteria and a dynamic document would be generated that includes fourteen items, each of which is related to World War II. This dynamically generated list, which itemizes the fourteen items, may also specify the starting bid, the current bid, and the auction ending time for each item. By generating this document with dynamic publishing services 254, documents can be generated that more accurately reflect current conditions.

Regardless of whether the static publishing service 252 or dynamic publishing service 254 produce the file, the file can be published over various channels, such as: a web site; an email broadcast; a wireless broadcast; a syndication stream; and a printed publication, for example. The file can also be published in various formats, such as HTML, XML, and PDF, for example.

For web site publishing, the file being published may be posted to a website so that the file is accessible by various users and guests. If security or access is a concern, the file may be published on an intranet (which is not remotely accessible), or within a restricted access user section of a website.

For email broadcasts, the file can be published as an attachment to an email that is sent out to a distribution list of individual users. Alternatively, the file may be converted into a format (e.g., ASCII text, and HTML) that is easily incorporated into the body of an email.

For wireless broadcasts, the file can be transmitted to users over a wireless network. This file may be text-based (such as an email attachment sent to a wireless email device) or multimedia-based (such as a sound file sent to a cellular telephone).

For syndication streams, the file may be published on data streams that are text-based (such as streaming messages), audio-based (such as streaming audio), video-based (such as streaming video), or multimedia-based (such as streaming audio/video), for example.

For printed publications, the file being published may be printed on traditional printing systems (laser printers) and distributed using traditional distribution paths (e.g., interoffice mail, courier, or the postal service, for example).

As above, the dependent applications 12, 14, 16 (FIG. 1) described above access each service offered by multi-channel deployment group 250 (e.g., static publishing service 252, and dynamic publishing service 254) by making the appropriate request of and establishing a connection through the API assigned to that particular service. For this particular group, API 256 is assigned to the static publishing service 252, and API 258 is assigned to the dynamic publishing service 254.

Figure 6:
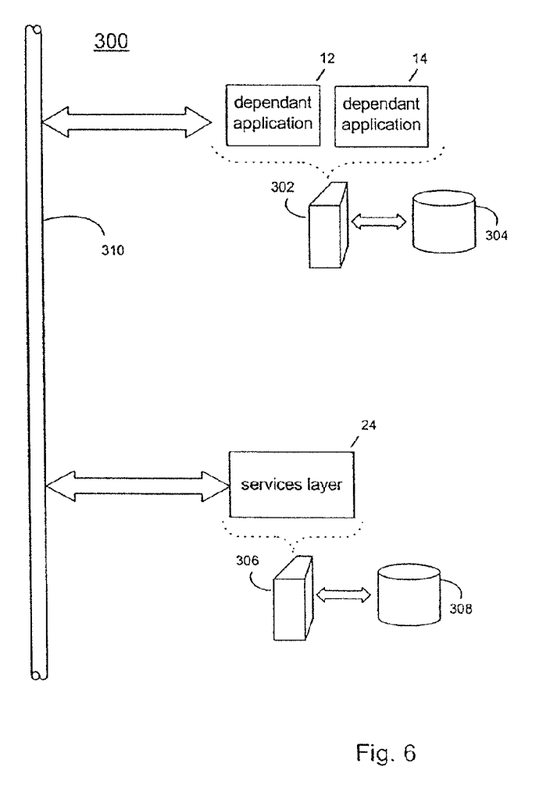
FIG. 6 is a block diagram the adaptive content platform incorporated into a distributed computing system.

Referring to FIG. 6, a distributed computing system 300 is shown which incorporates the adaptive content platform described above. Distributed computing system 300 includes a local (or first) computing device 302 that executes one or more content-enabled dependent applications 12, 14. As described above, each of the dependent applications includes business logic and a user interface (FIG. 1).

A storage device 304 stores the individual instruction sets and subroutines of dependent applications 12, 14. Storage devices 304 may be a hard disk drive, a tape drive, an optical drive, a RAID array, a random access memory (RAM), or a read-only memory (ROM), for example. Local computing device 302 includes at least one processing unit (not shown) and main memory system (not shown).

A remote (or second) computing device 306 (e.g., a web server) executes the services layer 24, as described above. Typically, services layer 24 is interfaced with a software infrastructure (not shown), which is interfaced with a data layer (not shown), which is interfaced with an OS layer (not shown).

A storage device 308 stores the individual instruction sets and subroutines of services layer 24 (and any additional required layers or infrastructure). Storage device 308 may be a hard disk drive, a tape drive, an optical drive, a RAID array, a random access memory (RAM), or a read-only memory (ROM), for example. Remote computing device 306 includes at least one processing unit (not shown) and main memory system (not shown).

Local computing device 302 and remote computing device 306 are interconnected with a network 310, such as a LAN (local area network), WAN (wide area network), the Internet, or an intranet, for example.

While the above-described embodiment discusses the deployment of the services layer on a single second computer, other configurations are possible, such as those in which each service, or a group of services, is deployed on its own dedicated computer.

While the above-described embodiment describes a local and a remote computing device, this is not intended to define the physical location of either computing device and is merely intended to indicate that the second computing device is remote (i.e., separate) from the first computing device.

While the above-described embodiment discusses the use of content-enabled dependent applications, other configurations are possible, such as data-enabled dependent applications (i.e., those designed to manage data, as opposed to content).

While the above-described embodiment specifies a software infrastructure 24 that is an application server, other configurations are possible, such as a general-purpose operating system (e.g. UNIX, Windows 2000) or a special-purpose operating system (e.g. embedded OS, real time OS).

While the above-described embodiment illustrates the availability of three services and three dependent applications, the actual number of services and dependent applications can be adjusted based on system requirements.

Figure 7:
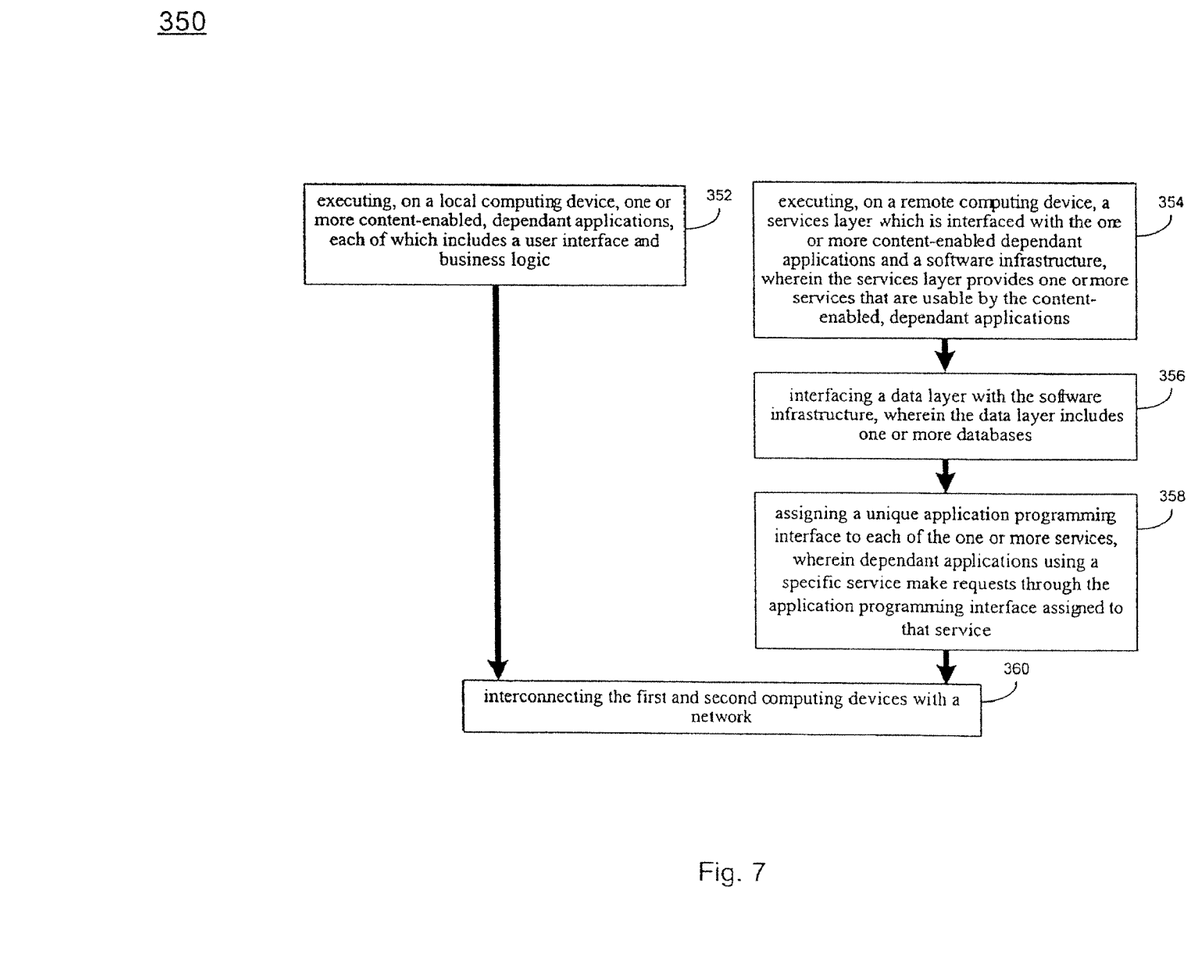
FIG. 7 is a flow chart of a distributed computing method.

Referring to FIG. 7, a distributed computing method 350 is shown. One or more content-enabled, dependent applications are executed 352 on a local computing device. Each dependent application includes a user interface and business logic. A services layer, which is interfaced with the dependent applications and a software infrastructure, is executed 354 on a remote computing device. The services layer provides one or more services that are usable by the content-enabled, dependent applications.

A data layer, which includes one or more databases, is interfaced 356 with the software infrastructure. A unique application programming interface is assigned 358 to each of the services. Dependent applications using a specific service make requests through the application programming interface assigned to that service.

The first and second computing devices are interconnected 360 with a network.

Figure 8:
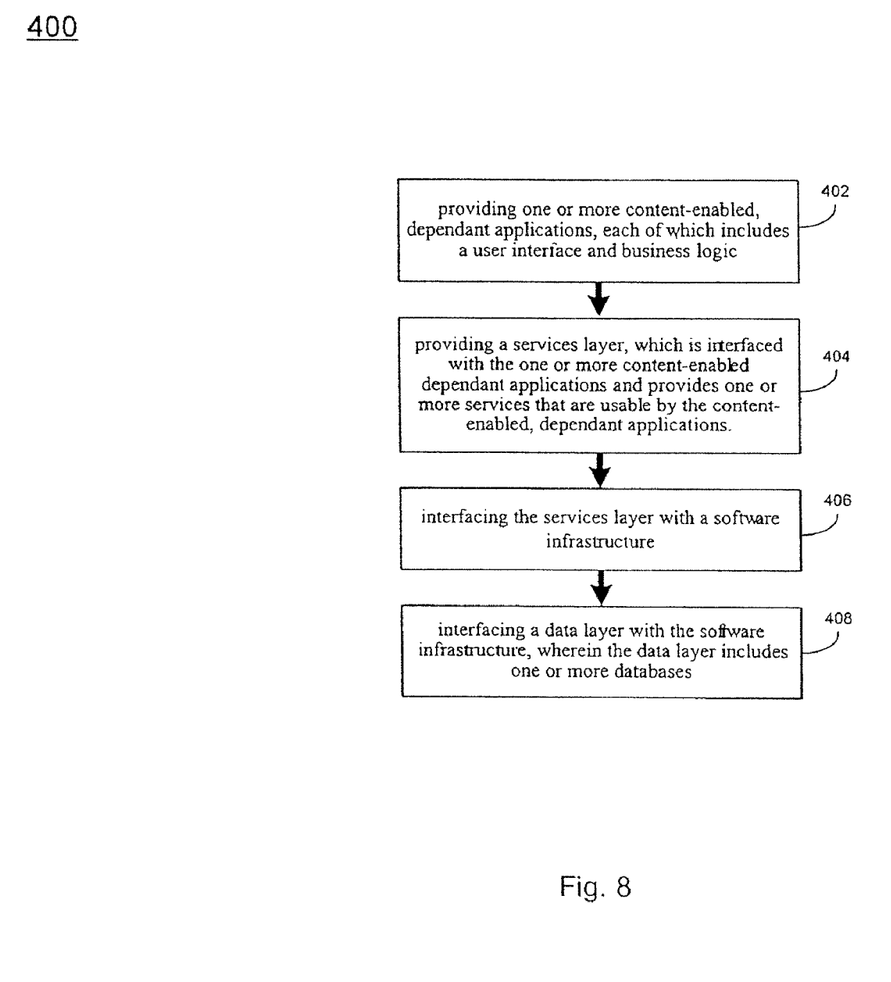
FIG. 8 is a flow chart of a multi-tier software development method.

Referring to FIG. 8, a multi-tier software development method 400 is shown. One or more content-enabled, dependent applications are provided 402, each of which includes a user interface and business logic. A services layer is provided 404, which is interfaced with the one or more content-enabled dependent applications and provides one or more services that are usable by the content-enabled, dependent applications. The services layer is interfaced 406 with a software infrastructure interfaced 408 with a data layer. The data layer includes one or more databases.

The embodiments described herein are not limited to the embodiments described above; it may find applicability in any computing or processing environment. The embodiments may be implemented in hardware, software, or a combination of the two. For example, the embodiments may be implemented using circuitry, such as one or more of programmable logic (e.g., an ASIC), logic gates, a processor, and a memory.

The embodiments may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments may also be implemented as a machine-readable storage medium, configured with a computer program, where, upon execution, instructions in the computer program cause a machine to operate to perform the functions of the embodiments described above.

The embodiments described above may be used in a variety of applications. Although the embodiments are not limited in this respect, the embodiments may be implemented with memory devices in microcontrollers, general purpose microprocessors, digital signal processors (DSPs), reduced instruction-set computing (RISC), and complex instruction-set computing (CISC), among other electronic components.

The embodiments described above may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the embodiments described above.

What is claimed is:

1. A non transitory computer-readable storage medium storing an adaptive content platform having multi-tiered software architecture, comprising:

a services layer that includes at least repository services, workflow services, file handling services, and publishing services;

a data layer for providing data services to the adaptive content platform with such data services including at least access to database storage and file storage that contain content;

an application server layer that connects to a dependent applications layer through the services layer and retrieves content from the data layer, with the application server layer for handling operations of the dependent applications within the adaptive content platform, wherein the dependent applications layer that includes a plurality of content-enabled dependent applications that connect to the services layer and a web layer, and whose operations are controlled by the applications server layer, with each content-enabled dependent application being interfaced with services of the services layer such that specific content from the services layer is combined to define and build a combination application that emulates a standalone independent application, wherein the web layer that connects to the dependent applications layer for enabling users to interface with the adaptive content-platform; and a user interface for displaying information, wherein information displayed in the user interface is dynamically generated according to one or more types of content defined for the dependent applications and an access level defined for a particular user.

* * * * *